United States Patent

Kitamura et al.

[11] 4,384,059
[45] May 17, 1983

[54] HALOGEN-CONTAINING RESIN COMPOSITIONS STABILIZED BY METHIONINE DERIVATIVES

[75] Inventors: Nobuyoshi Kitamura, Sagamihara; Nobuo Ito, Ooisomachi; Koji Takeuchi, Yokohama, all of Japan

[73] Assignee: Ajinomoto Company Incorporated, Tokyo, Japan

[21] Appl. No.: 348,274

[22] Filed: Feb. 12, 1982

[30] Foreign Application Priority Data

Feb. 26, 1981 [JP] Japan ................................. 56-27270
Feb. 26, 1981 [JP] Japan ................................. 56-27271

[51] Int. Cl.$^3$ .............................................. C08K 5/37
[52] U.S. Cl. .................................. 524/100; 524/106; 524/178; 524/213
[58] Field of Search ...................... 524/100, 106, 213; 544/383, 312; 562/556

[56] References Cited

U.S. PATENT DOCUMENTS 3,939,175 2/1976 Schmidt et al. ...................... 524/100
4,117,029 9/1978 Kitano .................................. 524/106

FOREIGN PATENT DOCUMENTS 43-9049 4/1968 Japan .
49-16108 4/1974 Japan .
49-16109 4/1974 Japan .
51-39988 10/1976 Japan .

OTHER PUBLICATIONS

Shelton, "Stabilization Fundamentals in Thermal Autoxidation of Polymers", Stabilization and Degradation of Polymers, Allara and Hawkins, (1978), pp. 215 to 225.

Primary Examiner—V. P. Hoke
Attorney, Agent, or Firm—Oblon, Fisher, Spivak, McClelland & Maier

[57] ABSTRACT

A stabilized halogen-containing resin composition which comprises (A) a halogen-containing resin, (B) at least one of methionine derivatives selected from the group consisting of compounds having the following structural formula (I) to (III)

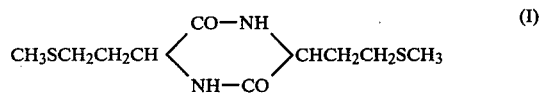

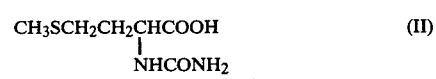

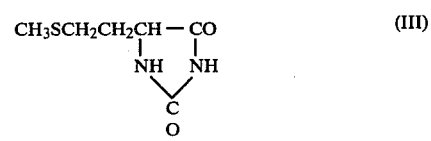

and (C) at least one of stabilizers selected from the group consisting of alkaline earth metal, zinc and organo tin compounds.

5 Claims, No Drawings

HALOGEN-CONTAINING RESIN COMPOSITIONS STABILIZED BY METHIONINE DERIVATIVES

The present invention relates to a halogen-containing resin composition having good processing property, excellent long-term thermal stability, transparency and prevention of initial discoloration.

When halogen-containing resins, for example polyvinyl chloride resin are subjected to heating during molding and using or to exposure to sunlight, they undergo decomposition reaction which is mainly attributable to release of halogen chloride in the molecular chain and subsequently coloration, discoloration and deterioration of mechanical strength occur. In order to avoid such faults, stabilizers have been added to the halogen-containing resins.

Although alkaline earth metal, zinc, lead and organo tin stabilizers have been mainly employed, each of these stabilizers is not sufficient in long-term thermal stability, and particularly zinc and alkaline earth metal stabilizers cause initial discoloration rapidly at the usual processing temperature of the halogen-containing resin. Thus, the improvement in thermal stability has been eagerly sought.

An object of the present invention is to provide a new class of stabilizer assistant of certain amino acid derivative which is effective to greatly improve thermal stability and initial discoloration of the alkaline earth metal, zinc and organo tin stabilizers.

According to the present invention, they may be obtained a halogen-containing resin composition having good processing property, excellent long-term thermal stability, transparency and prevention of initial discoloration when at least one of the following three kinds of methionine derivatives having the structural formula (I) to (III) is incorporated in a halogen-containing resin, together with at least one of stabilizers selected from the group consisting of alkaline earth metal, zinc and organo tin compounds.

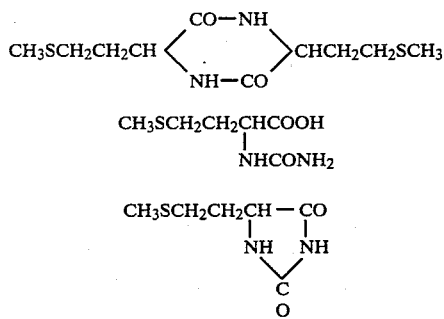

Although attempts have been made to employ amino acid metal salts, amino acid derivatives such as amino acid esters or amides as stabilizer for halogen-containing resin (Japanese Patent Publication Nos. 16109/1974 and 39988/1976), satisfactory thermal stability cannot be achieved.

Among various amino acid-diketopiperazines-hydantoic acids and -hydantoins, especially methionine-diketopiperazine (3.6-Dioxo-2.5-bis-[2-methylmercapto-ethyl]-piperazin) (I), -hydantoic acid (N-Carbamoyl-methionine) (II) and -hydantoin (5-[β-Methylmercapto-ethyl]-hydantoin) (III) shows not only excellent thermal stability effect, but also excellent transparency, prevention of initial discoloration and reduction of gelation time, as evidenced by Examples after-mentioned. Methionine hydantoin (III) is the most preferred stabilizer assistant.

The methionine derivatives which may be employed as stabilizer assistant in the present invention may be either optically active or racemic.

Methionine diketopiperazine (I) may be easily obtained by heating optically active or inactive methionine in a solvent (such as ethylene glycol) at 150°~250° C. or by heating methionine ester in a solvent at 150° C.~250° C. Also, methionine hydantoic acid (II) methionine hydantoin (III) may be prepared by the following manner. An optically active or inactive methionine is reacted with potassium cyanate in an aqueous medium at 70° C. for 1 hour under stirring. And then, the reaction solution is cooled to room temperature, acidified to pH 2~3 and allowed to stand in a refrigerator to crystalize methionine hydantoic acid. Methionine hydantoin may be obtained by heating methionine hydantoic acid in an acidic medium at reflux temperature for several score minutes.

Examples of stabilizers whose thermal stabilizing effect is increased in combination with these methionine derivatives of the present invention include oxides, hydroxides, sulfates, organic acid salts of divalent metals selected from the group consisting of alkaline earth metal and zinc, and organo tin compound such as dibutyl tin laurate or dioctyl tin maleate. However, it is particularly preferable to use divalent metal soaps such as calcium-zinc soap and barium-zinc soap which are non-toxic or low toxic stabilizers. The carbon number of fatty acid used as material of metal soaps is about 5 to 22.

The amount of stabilizer used in the present invention may be 0.1 to 15 parts by weight, preferably 0.3 to 5 parts by weight per 100 parts by weight of halogen-containing resins. Also, the amount used of the methionine derivatives of the present invention may be 0.01 to 5 parts by weight per 100 parts by weight of halogen-containing resin.

If necessary, there may be further incorporated plasticizers, antioxidants, lubricants, ultraviolet absorption agent and the like.

Examples of halogen-containing resins defined in the present invention include polyvinyl halide: polyvinylidene halide: a copolymer of vinyl halide and vinylidene halide: a copolymer of vinyl halide and ethylene: a copolymer of vinyl halide or vinylidene halide with another unsaturated monomer copolymerizable therewith, for example the vinyl esters of carboxylic acids such as vinyl acetate, vinyl propionate, vinyl butyrate and vinyl benzoate; esters of unsaturated acids such as methyl, ethyl, propyl, butyl and allyl esters of acrylic acid and the corresponding esters of methacrylic acid; vinyl aromatic compounds such as styrene; esters of α,β-unsaturated carboxylic acids such as methyl, ethyl, propyl and octyl esters of maleic, crotonic, itaconic and fumaric acids: halogenated polyolefins e.g. chlorinated polyethylene and chlorinated polypropylene: and polyolefins containing a very small amount of halogenide catalyst as impurity. Preferably the halides referred to in this present paragraph are chlorides.

In the compounding of the stabilized halogen-containing resins, a stabilizer and a stabilizer assistant as above-mentioned are ordinarily incorporated in the halogen-containing resins together with the necessary plasticizers by suitable milling techniques, and then the resulting composition is processed at an elevated temperature, for example, within the range from 150° C. to 200° C. on hot rolls or in a heated mixer.

The stabilized composition of this invention are useful in the manufacture of mouldings, extrusions, sheets, films, coatings and similar articles.

In the following Referential Examples and Example which are further illustrative of the present invention. As polyvinyl chloride, there was employed "Geon EP-103" (trade name, a product of Nippon Zeon Co., Ltd. 1050 of average degree of polymerization).

PREPARATION EXAMPLE 1

30 Grams (0.2 mole) of DL-methionine was mixed with 160 ml of ethylene glycol and heated at 180° C. for 1.5 hours. The resultant homogeneous reaction solution was allowed to stand overnight in a refrigerator. The precipitated crystals was filtered out and recrystallized from ethanol to obtain 13 g of methionine diketopiperazine. Yield 50%. It melted at 240° C.

PREPARATION EXAMPLE 2

150 Grams (1 mole) of DL-methionine and 100 g (1 mole) of potassium cyanate having 80% purity were mixed with 700 ml of water and stirred at 70° C. for 1 hour. After cooling to room temperature, the reaction solution was adjusted to pH 2~3 with 12% hydrochloric acid to obtain 154 g of DL-methionine hydantoic acid having a melting point of 95°~98° C.

130 Grams of DL-methionine hydantoic acid was added to 1 l of 12% hydrochloric acid and refluxed for 15 minutes. The reaction solution was allowed to stand in a refrigerator whereby 91 g of DL-methionine hydantoin having a melting point of 107°~109° C. was obtained.

In a similar manner, other amino acid-hydantoic acids and -hydantoins were prepared.

EXAMPLE 1

The following formulated composition was blended for 5 minutes on a two-roll mill heated to 180° C. and then rolled into sheets having 0.5 mm thickness. Each of small pieces of said sheets was subjected to heat treatment in a Geer's aging tester maintained to 180° C. for evaluation of thermal stability and initial discoloration.

The evaluation of thermal stability test was determined by times for brown coloration or appearance of black spots.

Degree of initial discoloration was evaluated on the basis of the following indication.
A: colorless
B: slightly yellowish
C: brown

| Formulation | |
|---|---|
| Polyvinyl chloride | 100 parts by weight |
| Zn—stearate | 1.0 |
| Ca—stearate | 1.0 |
| Stabilizer assistant | 0.5 |

For comparison, a similar test was conducted with respect to system wherein metal soaps only was incorporated without any stabilizer assistant and with respect to system wherein there was incorporated other amino acid derivative than methionine derivatives of the present invention.

The results are summarized in table 1.

TABLE 1

| | Stabilizer assistant | Thermal stability (min.) | Initial discoloration |
|---|---|---|---|
| The present invention | Methionine diketopiperazine | 35 | B |
| | Methionine hydantoic acid | 30 | B |
| | Methionine hydantoin | 35 | B |
| Control | None | Deterioration | — |
| | Phenylalanine diketopiperazine | 5 | B |
| | Valine diketopiperazine | 5 | B |
| | Phenylalanine hydantoic acid | Deterioration | — |
| | Lysine hydantoin | 5 | C |
| | Valine hydantoin | 5 | B |
| | Isoleucine hydantoin | 5 | B |

As is apparent from data in table 1, it is understood that the methionine derivatives of the present invention have greatly improved thermal stability in comparison with other amino acid derivatives.

EXAMPLE 2

50 parts by weight of plasticizer dioctyl phthalate was added to the formulated composition of Example 1 and blended for 5 minutes on a two-roll mill heated to 160° C., and then rolled into sheets having 0.5 mm thickness.

Each of small pieces of said sheets was subjected to heat treatment in a Geer's aging tester maintained to 180° C. for evaluation of thermal stability.

Also, eight of sheets were stacked one after another and heat-pressed at 170° C. under a pressure of 100 Kg/cm² for 20 minutes to prepare a test specimen having 3 mm thickness for evaluation of degree of discoloration and transparency.

For comparison, similar tests were conducted with respect to system wherein metal soaps only was incorporated without any stabilizer assistant, with respect to system wherein other amino acid derivative or epoxidized soybean oil was incorporated in place of methionine derivative of the present invention.

The results are summarized in table 2.

TABLE 2

| | Stabilizer assistant | Thermal stability | Degree of coloration | Opacity* |
|---|---|---|---|---|
| The present invention | Methionine diketopiperazine | 60 | A | 7.3 |
| | Methionine hydantoic acid | 60 | B | 7.1 |
| | Methionine hydantoin | 70 | B | 6.9 |
| Control | None | 20 | B | 8.4 |
| | Epoxidized soybean oil | 40 | C | 8.1 |
| | Phenylalanine diketopiperazine | 20 | B | 7.6 |
| | Valine diketopiperazine | 20 | B | 8.2 |
| | aline hydantoic acid | 20 | B | 8.0 |
| | Lysine hydantoin | 20 | B | 8.1 |

TABLE 2-continued

| Stabilizer assistant | Thermal stability | Degree of coloration | Opacity* |
|---|---|---|---|
| Valine hydantoin | 30 | B | 7.8 |
| Isoleucine hydantoin | 20 | B | 7.9 |

*Opacity was measured using color difference meter (digital) (TOYOSEIKI SEISAKUSHO CO., LTD. UNICC-33H). Adjust the Y value to 100.0. Put the sample on the sample head and by standard plate (white) read the value of Y. Then, remove the White Plate and lay the Black Plate on the sample. Read the value of Y. The Opacity can be obtained from following equations.

Opacity = $\frac{B}{W} \times 100$ where, W is the value of Y using White Plate and B is the value of Y using Black Plate.

EXAMPLE 3

1.0 part of dibutyl tin dilaurate and 0.3 part of the sample of stabilizer assistant were mixed with 100 part of polyvinyl chloride and 50 part of dioctyl phthalate. The mixture was blended for 5 minutes on a two-roll mill heated to 160° C. and then rolled into sheets having 0.5 mm thickness. The sheet was subjected to heat treatment in Geer's aging tester maintained to 180° C. for evaluation of thermal stability and initial discoloration. The results are shown in Table 3. For comparison, similar tests were conducted with sheets formed of similar composition but had no stability assistant and the sheets containing diketopiperazine, hydantion of the other amino acids, in place of the sample of the present invention.

TABLE 3

| | Stabilizer assistants | Thermal stability | Degree of coloration |
|---|---|---|---|
| The present invention | Methionine diketopiperazine | 100 | B |
| | Methionine hydantoic acid | 90 | B |
| | Methionine hydantoin | 100 | B |
| | None | 60 | B |
| Control | Valine diketopiperazine | 60 | B |
| | Isoleucine hydantoin | 60 | B |
| | Valine hydantoin | 60 | B |

The results are also shown in table 3. From the date in table 3, it is apparent that the samples of present invention greatly improve the thermal stability.

EXAMPLE 4

Table 4 shows the result of Plastograph test. The following formulation and test condition was used.

| polyvinyl chloride | 100 part |
|---|---|
| dioctyl phthalate | 25 |
| zinc stearate | 0.6 |
| calcium stearate | 0.4 |
| Sample of stabilizer assistant | 0.5 |
| condition | |
| Sample weight | 60 g |
| temperature | 130° C. |
| round per minute | 40 rpm |

The data of table 4 shows that the sample of this invention decrease constant torque and quickened the gelation. This fact suggest that the sample of this invention can save the energy of the processing.

TABLE 4

| | The present invention | | | |
|---|---|---|---|---|
| Stabilizer assistant Item | methionine diketo-piperazine | methionine hydantoic acid | methionine hydantoin | Control None |
| Maximum torque (m-kg) | 4.1 | 4.2 | 4.3 | 4.1 |
| Constant torque (m-kg) | 3.5 | 3.5 | 3.5 | 3.8 |
| Gelation time* (minutes) | 3.5 | 2.0 | 1.6 | 5.5 |

*time interval which reaches maximum torque.

What we claim is:

1. A halogen-containing resin composition which comprises (A) a halogen-containing resin (B) as a stabilizer assistant an amount sufficient for thermal stabilization of at least one of methionine derivatives selected from the group consisting of methionine hydantoic acid and methionine hydantoin and (C) at least one of stabilizers selected from the group alkaline earth metal, zinc and organo tin compounds.

2. A composition according to claim 1, wherein the stabilizer assistant is methionine hydantoin, and the stabilizer is an alkaline earth metal and zinc salts of $C_5 \sim C_{22}$ fatty acid.

3. A composition according to claim 1, wherein the stabilizer assistant is present in an amount of from 0.01 to 5 parts by weight per 100 parts by weight of the halogen-containing resin.

4. A composition according to claim 1, wherein the halogen-containing resin is polyvinyl chloride, polyvinylidene chloride, a copolymer of vinyl chloride or vinylidene chloride with a copolymerizable unsaturated monomer, a chlorinated polyethylene or a chlorinated polypropylene.

5. A composition according to claim 1 wherein the stabilizer assistant is methionine hydantoic acid.

* * * * *